Patented June 13, 1933

1,913,576

UNITED STATES PATENT OFFICE

MICHAEL J. WALSH, OF SAN DIEGO, CALIFORNIA, ASSIGNOR TO KELCO COMPANY, OF LOS ANGELES, CALIFORNIA, A CORPORATION OF DELAWARE

MANUFACTURE OF JELLIES

No Drawing.   Application filed March 24, 1930.   Serial No. 438,652.

This invention relates to the manufacture of jellies.

One object of my invention is to prevent or lessen the bleeding of jellies of vegetable origin, and in particular jellies obtained by the use of fruit pectin and/or agar-agar. A serious defect in such jellies as heretofore made is that when poured from a mould, after setting, they have a tendency to lose their firmness by the exudation of water therefrom, commonly known as "bleeding."

A further object of the invention is to enable citric acid to be added to such jellies to give the latter the desired tartness.

It is known that jelly can be obtained from fruit pectin and from agar-agar; for example a good jelly can be made by mixing one part of agar-agar, 15 parts of sugar and 100 parts of water. This mixture will set to a gel, but if it is removed from the mould and allowed to stand for a short time it will begin to bleed or exude water.

I have discovered that such bleeding can be prevented by adding to the original mixture of jelly making ingredients a small proportion of sodium alginate. If one part of sodium alginate is added to the above named mixture the resultant jelly will retain a smooth unbroken surface when removed from the mould and will not bleed.

I preferably use a bleached, well filtered, edible sodium alginate; such an alginate will give a clear bright solution.

I have found good stable jellies can be produced by mixing the ingredients in the following proportions;

|  | Per cent |
|---|---|
| Agar-agar | .75 to 1 |
| Sodium alginate | .5 to 1 |
| Sugar | 15 to 20 | with sufficient water (approximately 83 to 78%) to make a total of 100% in each mixture.

If pectin is used instead of agar-agar, like proportions of anhydrous pectin may be employed.

Heretofore the addition of citric acid to solutions of agar-agar would seriously decrease the strength of the jelly. I have discovered that when sodium alginate is used as above specified, I can also add from .03% to .04% of citric acid to the mixture and that such acid increases the viscosity of the sodium alginate and actually enhances the strength of the jelly.

The citric acid can similarly be used in connection with sodium alginate in the manufacture of pectin jellies in the proportions above referred to; namely .03% to .04% of the mixture.

I claim;

1. A jelly containing a very small per cent of sodium alginate whereby bleeding of the jelly is prevented.

2. A vegetable jelly containing a very small per cent of sodium alginate whereby bleeding of the jelly is prevented.

3. A jelly comprising fruit pectin, sugar and water, and a very small per cent of sodium alginate whereby bleeding of the jelly is prevented.

4. A jelly comprising fruit, agar-agar, sugar and water, and a very small per cent of sodium alginate whereby bleeding of the jelly is prevented.

5. In combination a jelly including approximately three per cent of citric acid, and approximately one per cent of sodium alginate whereby bleeding of the jelly is prevented.

6. In combination a jelly composed of ingredients of vegetable origin and including approximately three per cent of citric acid, and approximately one per cent of sodium alginate whereby bleeding of the jelly is prevented.

7. In combination a jelly including fruit pectin sugar and approximately three per cent of citric acid; and approximately one per cent of sodium alginate whereby bleeding of the jelly is prevented.

8. A jelly comprising approximately 1% of agar-agar, approximately 1% of sodium alginate, approximately 15% of sugar, and approximately 80% of water.

9. A jelly comprising approximately 1% of pectin, approximately 1% of sodium alginate, approximately 15% of sugar, and approximately 80% of water.

10. A jelly comprising approximately 1% of agar-agar, approximately 1% of sodium alginate, approximately 15% of sugar, approximately 80% of water, and about .3% of citric acid.

11. A jelly comprising approximately 1% of pectin, approximately 1% of sodium alginate, approximately 15% of sugar, approximately 80% of water, and about .3% of citric acid.

12. That improvement in the art of making jellies of vegetable origin; consisting in adding to the jelly making ingredients a small percentage of sodium alginate, whereby bleeding of the jelly is prevented.

MICHAEL J. WALSH.